US005872727A

United States Patent [19]

Kuo

[11] Patent Number: 5,872,727

[45] Date of Patent: Feb. 16, 1999

[54] PITCH SHIFT METHOD WITH CONSERVED TIMBRE

[75] Inventor: Chih-Chung Kuo, Hsinchu, Taiwan

[73] Assignee: Industrial Technology Research Institute, Hsinchu, Taiwan

[21] Appl. No.: 752,014

[22] Filed: Nov. 19, 1996

[51] Int. Cl.[6] .............................. G06F 17/10; G10H 7/00; G10H 1/06

[52] U.S. Cl. .................................. 364/724.1; 364/715.02; 381/61; 381/63; 84/603; 84/604; 84/607; 84/622; 84/623

[58] Field of Search .......................... 364/724.1, 724.011, 364/725.01, 715.02; 84/603, 604, 605, 606, 607, 622, 623; 381/61, 63

[56] References Cited

U.S. PATENT DOCUMENTS

| | | | |
|---|---|---|---|
| 4,729,112 | 3/1988 | Millar | 364/724.011 |
| 4,782,324 | 11/1988 | Underwood | 341/147 |
| 4,916,996 | 4/1990 | Suzuki et al. | 84/603 |
| 5,288,940 | 2/1994 | Izumisawa | 84/604 |
| 5,495,432 | 2/1996 | Ho | 364/724.1 |
| 5,567,901 | 10/1996 | Gibson et al. | 84/603 |
| 5,637,821 | 6/1997 | Izumisawa et al. | 84/604 |
| 5,641,926 | 6/1997 | Gibson et al. | 84/603 |
| 5,693,901 | 12/1997 | Matsungawa | 84/603 |
| 5,698,807 | 12/1997 | Massie et al. | 84/661 |
| 5,777,249 | 7/1998 | Suzuki | 84/604 |

*Primary Examiner*—Reba I. Elmore
*Assistant Examiner*—Sheela S. Rao
*Attorney, Agent, or Firm*—W. Wayne Liauh

[57] ABSTRACT

An improved method for shifting the pitches of a tone is disclosed. It comprises: (a) subjecting a digitized original waveform to a whitening process using an all-zero filter (AZF) to obtain a whitened waveform; (b) resampling the whitened waveform at a desired scaling ratio to obtain a scaled and whitened waveform; (c) subjecting the scaled and whitened waveform to a coloring process using an all-pole filter (APF) to obtain a synthesized waveform. In a preferred embodiment, the all-zero filter performs the transformation function of:

$$A(z/\alpha) = 1 - \sum_{i=1}^{p} a_i \alpha^i z^{-i},$$

and the all-pole filter performs the transformation function of:

$$B(z/\beta) = \frac{1}{1 - \sum_{i=1}^{q} b_i \beta^i z^{-i}}$$

wherein the $a_i$'s and $b_i$'s are linear predictive coefficients. The whitened waveforms can be compressed and stored as wavetables, which can be subsequently retrieved and decompressed before resampling.

14 Claims, 6 Drawing Sheets

PITCH SHIFT METHOD WITH CONSERVED TIMBRE

FIELD OF THE INVENTION

The present invention relates to an improved pitch shifting method and apparatus with reduced noise and reduced sound distortion. More specifically, the present invention relates to an improved method and apparatus for shifting the pitches of digital music tones that have been stored in the form of a wavetable. The method disclosed in the present invention reduces the noise and distortion problems that have been observed using the conventional frequency/period scaling method, while allowing the memory storage requirement to be lower than the conventional method.

BACKGROUND OF THE INVENTION

In music, a pitch is the position of a tone in the musical scale; it is by convention designated by a letter name and determined by the fundamental frequency of vibration of the source of the tone. An international conference held in 1939 set a standard for A above middle C of 440 cycles per second (440 Hz). The inverse of a fundamental frequency is the period corresponding to the waveform of that tone. Thus, by changing the period of a waveform, the pitch of a tone can be shifted. This is the so-called pitch shifting method to change music tones.

Recently, wavetable has become one of the most commonly used tools in synthesizing and providing high quality music sounds. One of the key elements of this technology involves methodologies which can provide best music sounds utilizing a minimum size of the wavetable. In applying the wavetable technology, only a small number of music tones are stored in digital forms for each music instrument in the wavetable, and other tones are synthesized via pitch shifts. Furthermore, in order to minimize the data storage requirement, the digital music tone data are typically compressed before storage.

Currently, the most common method providing pitch shifting involves a procedure which resamples the stored wavetable data at a different rate, coupled with an appropriate interpolation. Discussions of this procedure can be found, for example, in U.S. Pat. Nos. 5,131,042; 5,296,643; and 5,477,003, the contents thereof are incorporated by reference. This resampling procedure alters the period of the original tone by lengthening or shortening the period, and causes the pitch thereof to be shifted as a result. The resampling procedure can be effectuated by either changing the input (resampling) or the output (playback) rate.

The conventional pitch-shifting method can be illustrated in FIGS. 1A and 1B. FIG. 1A shows the original waveform and sampling points $x_0, x_1, x_2, \ldots, x_{10}$, etc. To increase the pitch by an octave (i.e., eight diatonic degrees), the fundamental frequency will be doubled, i.e., its period will be reduced by one-half. The conventional method accomplishes the pitch-shifting procedure by sampling the original waveform at twice the original speed, at $x_0, x_2, x_4, \ldots, X_{10}$, etc., as shown in FIG. 1B. A new waveform is obtained after this resampling procedure which exhibits a period that is one-half of the period of the original waveform as shown in FIG. 1A. This procedure can be generalized for other arbitrary frequency ratios. For example, for a waveform with a fundamental frequency of $F_0$ Hz, a new waveform with a different fundamental frequency of $F'_0$ Hz can be synthesized by resampling the original waveform at a rate of $F'_0/F_0$. In other words, a new waveform with a fundamental frequency of $F'_0$ Hz can be synthesized by scaling the original waveform at a scaling ratio of $F'_0/F_0$. When the scaling ratio is not an integer, linear interpolation technique is typically utilized during the resampling, so as to improve the accuracy thereof. FIG. 2 shows a block diagram of the conventional scaling procedure utilizing linear interpolation. A source waveform (e.g., trp57) is processed through the resampler-interpolator to obtain a synthesized waveform (e.g., a00). The resampler-interpolator performs the function of "spectral scaling".

Because of its simplicity and ease of implementation, the resampling method discussed above has been widely utilized in the industry. However, it has been observed that the conventional resampling procedure, which involves a scaling of the sound period, also causes the spectral envelop of the original music tone to be distorted. In order to maintain high fidelity and reduce the amount of distortion, some high-end instruments have refrained from shifting pitches over a large range, However, this causes the size of the wavetable, thus the required memory storage space, to be substantially increased.

In an article entitled "An Efficient Method for Pitch Shifting Digitally Sampled Sound," by K. Lent, *Computer Music Journal,* vol. 13, No. 4, pp. 65–71 (1989), the content thereof is herein incorporated by reference, it was disclosed a technique by which the period of a waveform is changed by inserting some "samples" to, or cutting some samples from, the period of the original waveform. This method, in theory, will not change the envelop of the frequency spectrum, thus allowing the timbre of the sound to be maintained. However, the questions involving, for example, where to lengthen or shorten the period, how to maintain smoothness at places where such insertion or cutting had occurred, and how to provide an appropriate truncation window as well as determining the values when the period is lengthened, etc., require relatively complicated computations. Thus this method has remained largely an academic interest and may not be considered practical for industrial applications.

SUMMARY OF THE INVENTION

The primary object of the present invention is to develop an improved method for shifting the pitch of a waveform and allowing the timbre to be conserved. More specifically, the primary object of the present invention is to develop an improved pitch-shifting method for use with digitally stored wavetables with lower distortion and less memory space requirement. The wavetables can be stored in compressed forms.

In the present invention, the original waveform is first subject to a whitening process using an all-zero filter (AZF) to obtain a whitened waveform. The whitened waveform is pitch-shifted using the conventional scaling procedure to obtain a scaled and whitened waveform (having the desired pitch). Finally, the scaled and whitened waveform is subjected to a coloring process using an all-pole filter (APF) to obtain the final waveform having the desired timbre. The coloring process using the all pole filter causes the final waveform to regain the spectrum envelop, after it is shifted to a new fundamental frequency with the scaling process.

In a preferred embodiment of the present invention, the original waveform is first analyzed using the linear prediction analysis method to obtain the linear predictive coefficients, $a_i$, and the all-zero-filter provides the following z-transform:

$$A(z) = 1 - \sum_{i=1}^{p} a_i z^{-i} \quad \text{(Eq. 1)}$$

In Eq. 1, p is the prediction order which is an integer greater than 0 and A(z) is the z-transform. An introductory explanation of the method of linear prediction of speech signals and linear predictor coefficients can be found in, for example, "Discrete-Time Processing of Speech Signals", MacMillian Publishing Company (1993), the content thereof is incorporated herein by reference.

In another preferred embodiment of the present invention, a weighting factor, α, is utilized to control the sensitivity of the whitening process. The modified z-transform for the all-zero-filter is provided as follows:

$$A(z/\alpha) = 1 - \sum_{i=1}^{p} a_i \alpha^i z^{-i} \quad \text{(Eq. 2)}$$

In Eq. 2, α is a weighting factor such that $0<\alpha\leqq 1$.

Preferably, the all-pole-filter utilized in the coloring process is the inverse filter of the all-white-filter. However, the all-pole-filter, B(z), can be separately provided according to the following z-transform:

$$B(z/\beta) = \frac{1}{1 - \sum_{i=1}^{q} b_i \beta^i z^{-1}} \quad \text{(Eq. 3)}$$

In Eq. 3, β is a weighting factor such that $0<\beta\leqq 1$, q is an integer greater than 0, and $b_i$'s can be either the linear predictive coefficients of the original waveform (i.e., $b_i=a_i$), or the linear predictive coefficients of the target waveform (i.e., the linear predictive coefficients obtained from the target waveform that has been recorded from the same instrument playing the note to be shifted to). Alternatively, the $b_i$'s can be the linear predictive coefficients of the target waveform to be shifted to, via the conventional scaling method (i.e., without the whitening and coloring process).

In Eqns. 1–3, p and q are the orders of the linear prediction analysis. The higher the values of p and q, the closer the description of the spectral shape, at the price of increased amount of parameters and calculation time.

By adding the steps of whitening and coloring before and after the conventional scaling process, the present invention reduces the distortion problems experienced by the prior art methods and allows the spectral envelop of the original waveform to be preserved. The method disclosed in the present invention also reduces the amount of noise associated with data compression (coding). In the present invention, the waveform is coded (compressed) after it is whitened. This precursory whitening process provides the following benefits:

(A) By reducing the variance, the required bit number for quantization is also reduced. This allows the processed waveform to be more suitable for instantaneous coding.

(B) The whitening step causes the quantization error also to be whitened, resulting in a relatively uniform signal-to-noise-ratio (SNR) distribution in the spectrum.

(C) The decoded (decompressed) waveform will be pitch-shifted with resampling and then be processed by the all-pole filter, which will give a spectral shape to whitened signal. Meanwhile, the (quantization) error spectrum will be shaped with the signal spectrum. This will cause the noise to be less perceptible by human ears, as a result of the masking effect of the human ears.

BRIEF DESCRIPTION OF THE DRAWING

The present invention will be described in detail with reference to the drawings showing the preferred embodiment of the present invention, wherein:

FIGS. 5A and 5B show the waveforms of an A3 pitch (trp57) and a G4 pitch (trp67), respectively, recorded from a trumpet; wherein trp57 is the original waveform and trp67 is the target waveform to be shifted to.

DETAILED DESCRIPTION OF THE PREFERRED EMBODIMENT

The present invention discloses an improved method for shifting the pitch of a waveform that has been digitally stored. Typically, a limited number of waveforms are stored as compressed or uncompressed wavetables, whose pitch will be then shifted after retrieval so as to provide a maximum range of music tones that can be played with minimum memory space requirement.

Figure 1A:
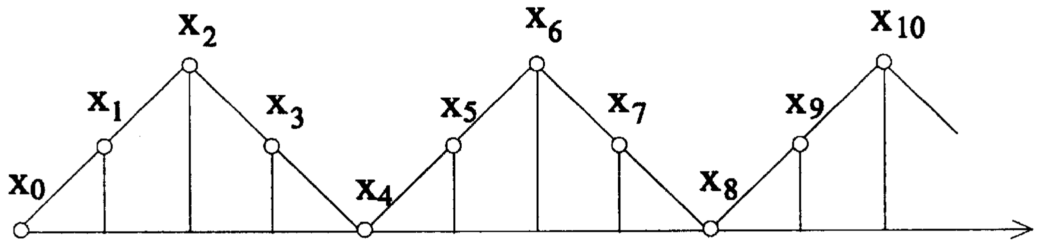
FIG. 1A is an illustrative schematic drawing showing a waveform to be scaled.
Figure 1B:
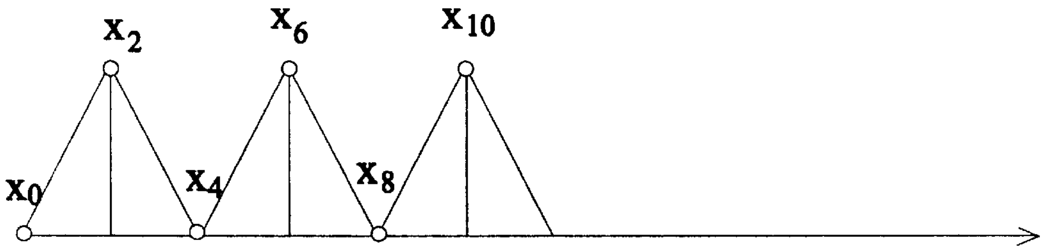
FIG. 1B is an illustrative schematic drawing showing the new waveform which is the waveform of FIG. 1A after it has been scaled by one-half via a conventional resampling procedure.
Figure 2:
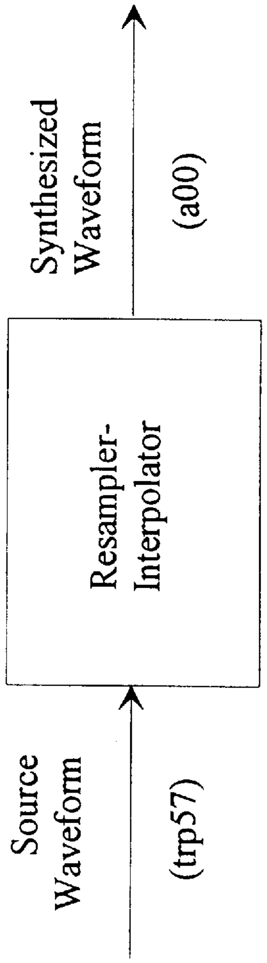
Fig. 2 (PRIOR ART)
FIG. 2 is a block diagram showing the steps of the conventional pitch-shifting process by scaling.
Figure 3:
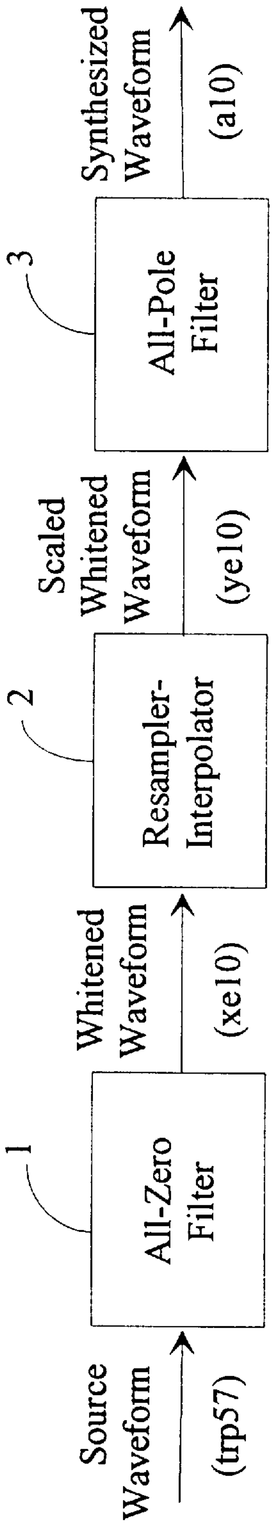
FIG. 3 is a block diagram showing the steps of a preferred embodiment of the present invention without data compression.

FIG. 3 is a block diagram showing the steps of a preferred embodiment of the present invention without data compression. The source waveforms are first subject to a spectral normalization process using an all-zero filter (AZF) to obtain a whitened waveform. The all-zero filter 1 utilizes the linear predictive coefficients, $a_i$, obtained from the source waveform and transforms the source waveform in accordance with the following z-transform (Eq. 1):

$$A(z) = 1 - \sum_{i=1}^{p} a_i z^{-i} \quad \text{(Eq. 1)}$$

In Eq. 1, p is a positive integer, and $a_i$'s are the linear predictive coefficients computed from the source waveform.

In another preferred embodiment of the present invention, a weighting factor, α, is utilized to control the degree of the whitening process. The modified z-transform for the all-zero-filter is provided as follows:

$$A(z/\alpha) = 1 - \sum_{i=1}^{p} a_i \alpha^i z^{-i} \quad \text{(Eq. 2)}$$

In Eq. 2, $\alpha$ is a weighting factor such that $0<\alpha\leqq 1$.

The whitened waveform is then passed through a resampler-interpolator 2, in which the whitened waveform is pitch-shifted via spectral scaling, to obtain a scaled and whitened waveform (which remains a whitened waveform). Finally, the scaled and whitened waveform is subjected to a coloring process using an all-pole filter (APF) 3 to obtain the final waveform having a properly adjusted period. The coloring process using the all-pole filter causes a spectral shaping of the final waveform and allows it to regain the spectrum envelop, after it is shifted to a newly synthesized waveform with a new fundamental frequency during the resampling step.

The all-pole filter 3 utilizes the linear predictive coefficients, $b_i$,'s, which were obtained either from the source waveform or from the target (to be synthesized) waveform, and transforms the scaled and whitened waveform in accordance with the following z-transform (Eq. 3):

$$B(z/\beta) = \frac{1}{1 - \sum_{i=1}^{q} b_i \beta^i z^{-1}} \quad \text{(Eq. 3)}$$

In Eq. 3, $\beta$ is a weighting factor such that $0<\beta\leqq 1$, q is a positive integer, and $b_i$'s can be either the linear predictive coefficients of the original waveform (i.e., $b_i=a_i$), or the linear predictive coefficients obtained by analyzing the target waveform.

In Eqns. 1–3, p and q are the orders of the linear prediction analysis method. The higher the values of p and q, the more precise the description of the spectral shape. However, higher values of p and q will increase the amount of parameters and calculation time.

Figure 4:
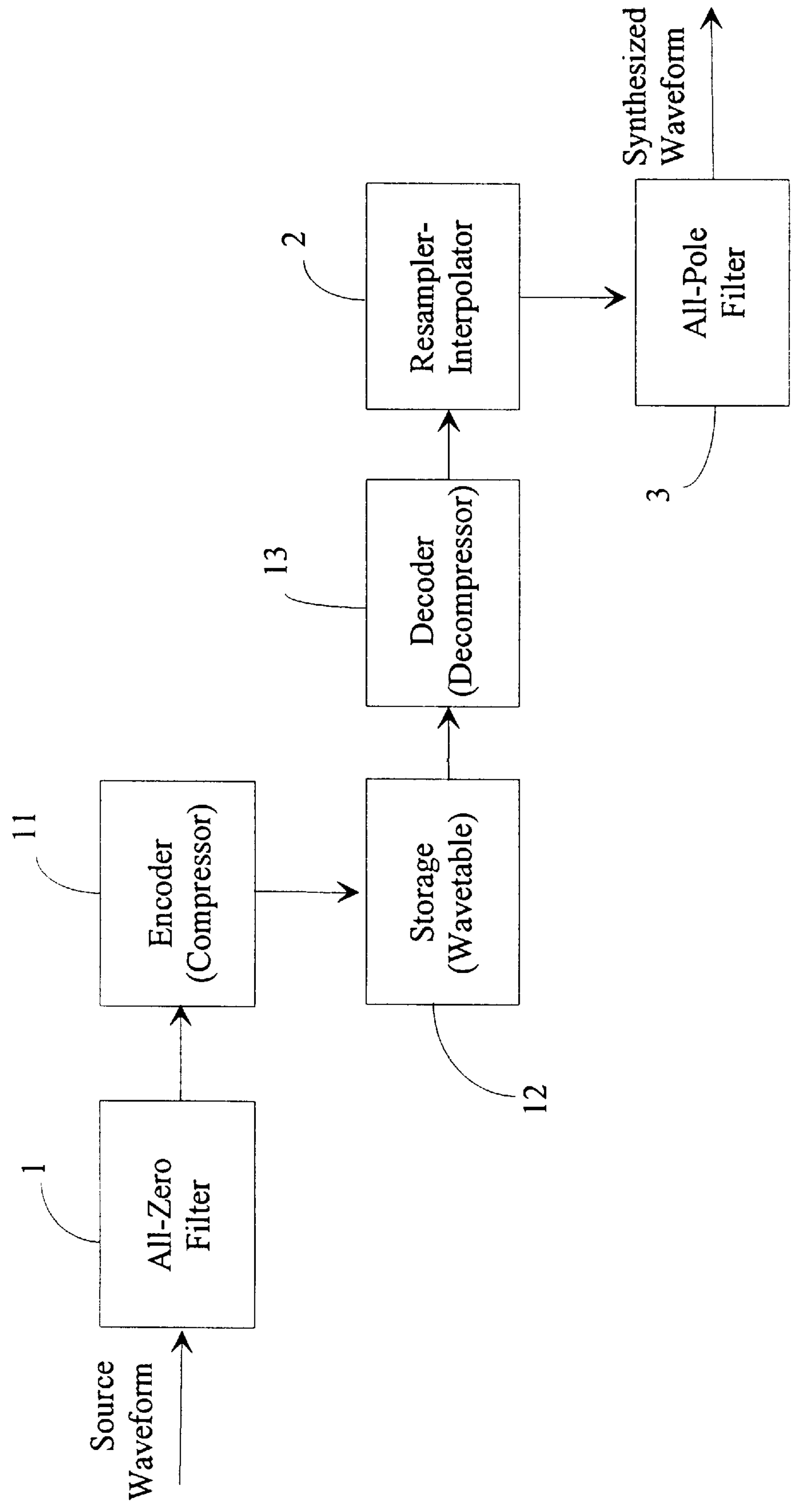
FIG. 4 is a block diagram showing the steps of another preferred embodiment of the present invention with data compression.

FIG. 4 is a block diagram showing the steps of another preferred embodiment of the present invention in which the whitened waveform after the all-zero filter is compressed by an encoder (or compressor) 11, and stored as wavetable in memory 12. When the waveform of a particular pitch is desired, an appropriate wavetable is retrieved from the memory 12, decompressed by a decoder (or decompressor) 13, and scaled by a resampler-interpolator 2 in a manner similar to the above discussed embodiment without compression. The scaled whitened waveform is then colored by the all-pole filter (APF) 3 to obtain the final waveform having the properly adjusted period. Again, the coloring process using the all-pole filter causes a spectral shaping of the final decompressed waveform and allows it to regain the spectrum envelop, after it is shifted to a newly synthesized waveform with a new fundamental frequency. By adding the steps of whitening and coloring before and after the conventional scaling process, respectively, the present invention eliminates the scaling distortion experienced by the prior art methods and allows the spectral envelop of the original waveform to be preserved. The method disclosed in the present invention, which involves the whitening step, also reduces the amount of noise that has been associated with data compression in the conventional process. As discussed earlier, the pre-compressing whitening process provides the benefits in that:

(a) by reducing the variance, the required bit number for quantization is also reduced. This allows the original waveform to be more suitable for instantaneous coding; and (b) the whitening step causes the quantization error also to be whitened, resulting in a relatively uniform signal-to-noise-ratio (SNR) distribution in the spectrum. Furthermore, the decoded (decompressed) waveform is pitch-shifted with resampling and then be processed by the all-pole filter, which will give a spectral shape to whitened signal. In this process, the quantization error spectrum will be shaped with the signal spectrum. This causes the noise to be less perceptible by human ears, as a result of the masking effect of the human ears.

The present invention will now be described more specifically with reference to the following examples. It is to be noted that the following descriptions of examples, including the preferred embodiment of this invention, are presented herein for purposes of illustration and description, and are not intended to be exhaustive or to limit the invention to the precise form disclosed.

EXAMPLE 1

Figure 5A:
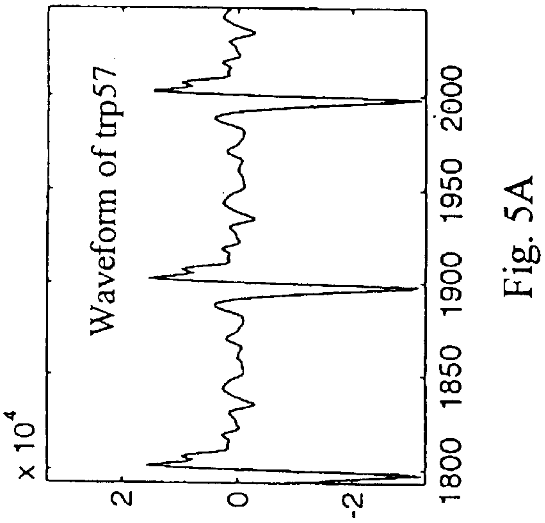
Figure 5B:
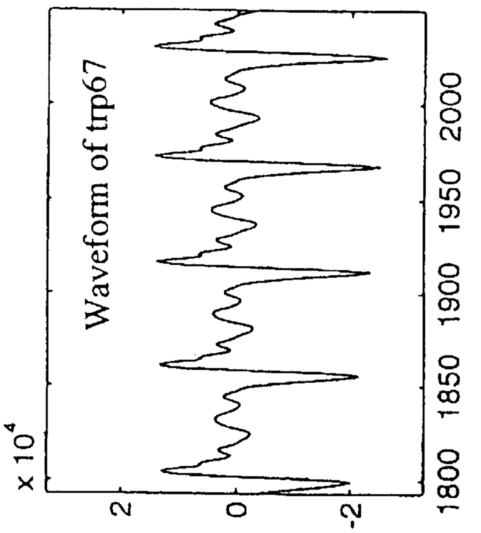

FIG. 5A shows the waveform of an A3 pitch (trp57) recorded from a trumpet, and FIG. 5B shows the waveform played by the same trumpet at G4 pitch (trp67). The fundamental frequencies of A3 and G4 are at 220 Hz and 392 Hz, respectively, representing a frequency ration of 392/220, or 1.78.

To save memory space, only the waveform of the A3 pitch was saved, and a pitch-shifter constructed according to the present invention was utilized to shift the A3 pitch to G4. The pitch-shifter had the parameters of p=q=4, $\alpha=\beta=1$, and $b_i=a_i$ (i.e., the linear predictive analysis was of the fourth order, and the linear prediction coefficients for both the all-zero filter and the all-pole filter were based on the A3 pitch) at a resampling ratio of 1.78 via linear interpolation. FIG. 5D shows the synthesized G4 waveform (a10) that had been pitch-shifted from the A3 waveform.

COMPARATIVE EXAMPLE 1

In a comparative example, the waveform of the A3 pitch was scaled using the conventional scaling method also at resampling ratio of 1.78 via linear interpolation. No whitening nor coloring step was involved in the conventional approach. The synthesized G4 waveform (a00) according to the conventional method is shown in FIG. 5C.

Figure 5C:
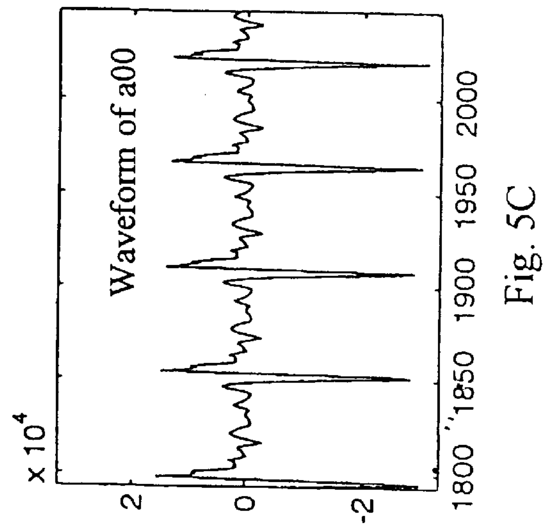
FIGS. 5C and 5D show the waveforms of the synthesized G4 pitch (a00 and a10), based from the A3 pitch (trp57), using the conventional scaling method (a00) and the pitch-shifting method disclosed in the present invention (a10), respectively.
Figure 5D:
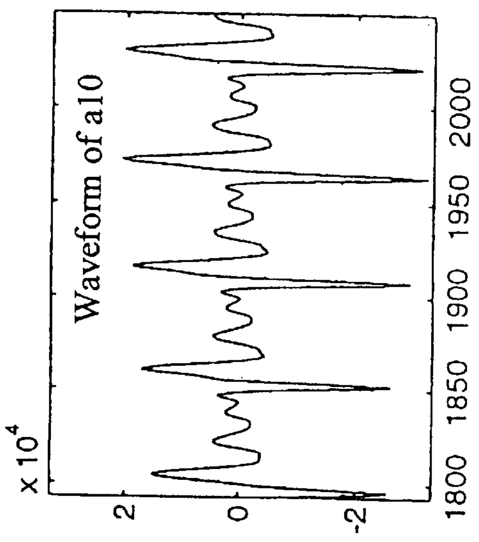

Comparing FIGS. 5A and 5C, because FIG. 5C was obtained from a direct scaling of FIG. 5A, at a scaling ratio of 1/1.78, or 0.56, it showed a significant amount of artificially generated high frequency ripples. These high frequency ripples were noticeably absent from the waveform obtained using the method of the present invention, as shown in FIG. 5*d*.

Figure 6A:
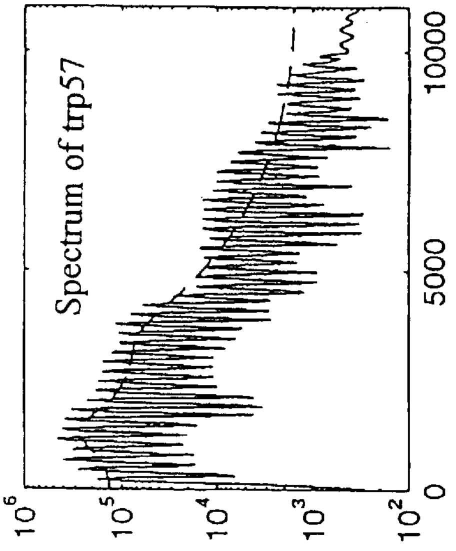
FIGS. 6A and 6B show the frequency spectra of the A3 pitch (trp57) and G4 pitch (trp67), of the waveforms shown in FIGS. 5A and 5B, respectively.
Figure 6B:
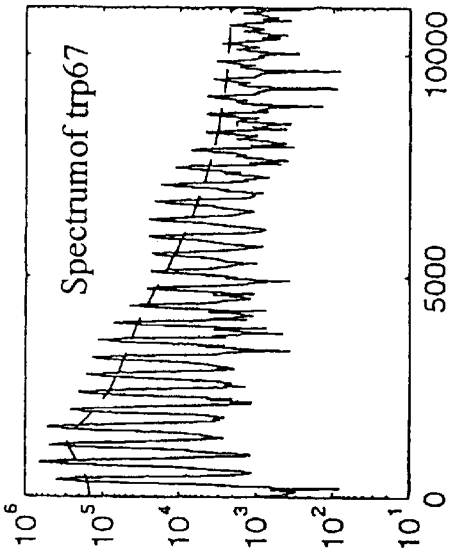
Figure 6C:
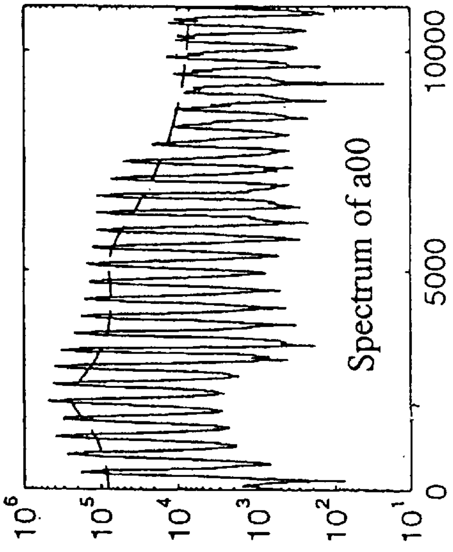
FIGS. 6C and 6D show the frequency spectra of the synthesized G4 pitch (a00 and a10), based from the A3 pitch (trp57), using the conventional scaling method (a00) and the pitch-shifting method disclosed in the present invention (a10), respectively.
Figure 6D:
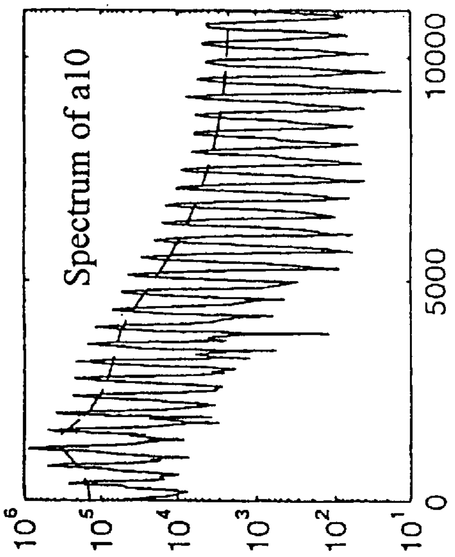

The advantages of the method disclosed in the present invention are more apparent by examining the frequency spectra of the synthesized and natural pitches. FIGS. 6A and 6B show the frequency spectra of A3 (trp57) and G4 (trp67) pitches of the waveforms shown in FIGS. 5A and 5B, respectively. FIG. 6C, which shows the frequency spectrum of the synthesized G4 (a00) according to the conventional method, indicates that spectral envelop of the scaled waveform was also scaled by a factor of 1.78. This resulted in a tone that would be too sharp and too "bright" compared to the original tone. The spectral tilt slope of FIG. 6C is substantially smaller than that of FIG. 6B, indicating large amounts of unnatural high frequency components. On comparison, FIG. 6D, which shows the frequency spectrum of the synthesized tone (a10) using the present invention, indicates that the frequency spectrum of the tone synthesized using the present invention is much closer to the genuine G4 tone than the conventional method. The dashed lines in FIGS. 6A–6D were frequency spectra obtained via linear prediction analysis.

Figure 7A:
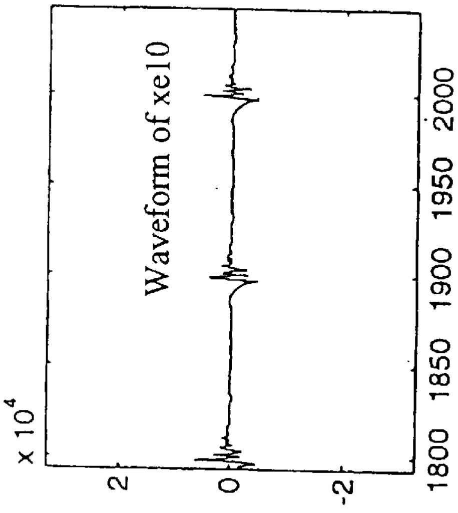
FIGS. 7A and 7C, respectively, show the waveforms of the two whitened signals before (xe10) and after (ye10) the resampling step as shown in FIG. 3.
Figure 7B:
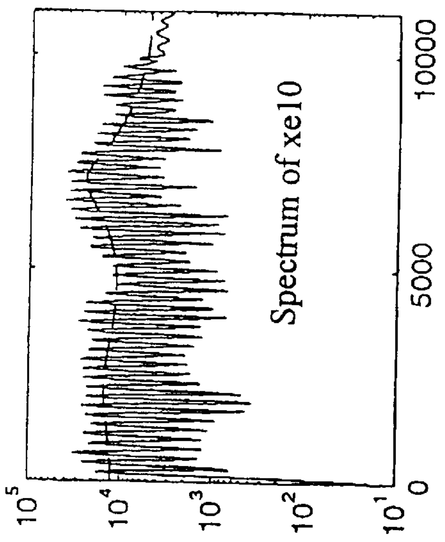
FIGS. 7B and 7D, respectively, show the frequency spectra of xe10 and ye10, respectively.
Figure 7C:
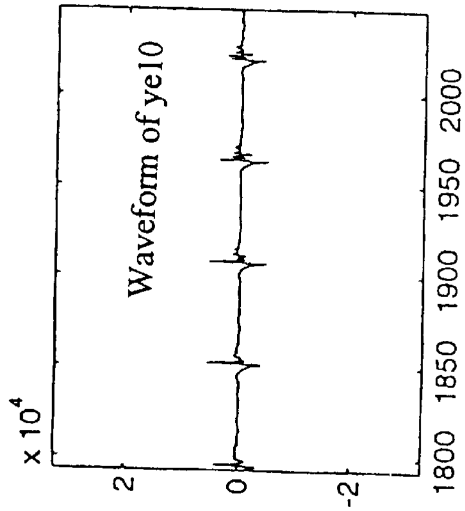
Figure 7D:
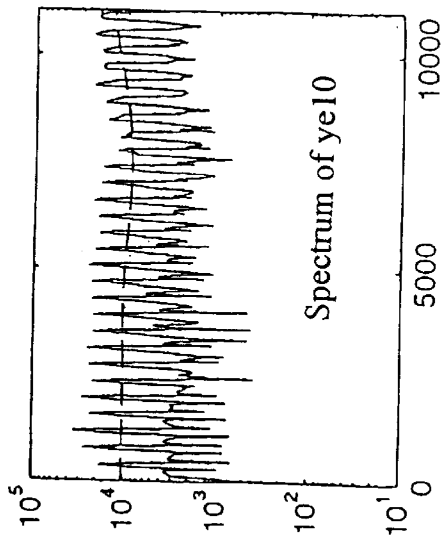

FIGS. 7A and 7C, respectively, show the waveforms of the two whitened signals before (xe10) and after (ye10) the resampling step as shown in FIG. 3. FIGS. 7B and 7C, respectively, show the frequency spectra of xe10 and ye10, respectively.

The foregoing description of the preferred embodiments of this invention has been presented for purposes of illustration and description. Obvious modifications or variations are possible in light of the above teaching. The embodiments were chosen and described to provide the best illustration of the principles of this invention and its practical application to thereby enable those skilled in the art to utilize the invention in various embodiments and with various modifications as are suited to the particular use contemplated. All such modifications and variations are within the scope of the present invention as determined by the appended claims when interpreted in accordance with the breadth to which they are fairly, legally, and equitably entitled.

What is claimed is:

1. A pitch-shifter for shifting pitches of a tone comprising:

(a) a memory for storing a tone whose original waveform has been digitized and whitened to become a whitened waveform;

(b) a resampler-interpolator for resampling said whitened waveform at a scaling ratio to obtain a scaled and whitened waveform;

(c) an all-pole filter (APF) provided to color said scaled and whitened waveform into a synthesized waveform;

(d) wherein said all-pole filter performs the following z-transform:

$$B(z/\beta) = \frac{1}{1 - \sum_{i=1}^{q} b_i \beta^i z^{-i}}$$

where $b_i$'s are linear predictive coefficients obtained from either said original waveform or a target waveform to be shifted to, q is an integer greater than 0, and $\beta$ is a weighting factor such that $0<\beta\leqq 1$.

2. The pitch-shifter according to claim 1 wherein $\beta=1$ and said all-pole filter performs the following z-transform:

$$B(z) = \frac{1}{1 - \sum_{i=1}^{q} b_i z^{-i}}$$

3. The pitch-shifter according to claim 1 wherein:

(a) said whitened waveform has been compressed into a wavetable before it is stored in said memory; and (b) said pitch-shifter further comprises a decoder for decompressing said wavetable.

4. The pitch-shifter according to claim 1 wherein said original waveform is whitened using an all-zero filter (AZF) which performs the following z-transform:

$$A(z/\alpha) = 1 - \sum_{i=1}^{p} a_i \alpha^i z^{-1}$$

where $a_i$'s are linear predictive coefficients obtained from said original waveform, p is an integer greater than 0, and $\alpha$ is a weighting factor such that $0<\alpha\leqq 1$.

5. The pitch-shifter according to claim 4 wherein $\alpha=1$ and said all-pole filter performs the following z-transform:

$$A(z) = 1 - \sum_{i=1}^{p} a_i z^{-i}$$

6. The pitch-shifter according to claim 4 wherein said $b_i$'s are linear predictive coefficients obtained from said original waveform such that $b_i=a_i$.

7. The pitch-shifter according to claim 1 wherein at least one of said p and q equals 4.

8. A music tone generating apparatus for generating tones of various pitches comprising:

(a) a memory for storing a tone whose original waveform has been digitized and whitened to become a whitened waveform;

(b) a resampler-interpolator for resampling said whitened waveform at a scaling ratio to obtain a scaled and whitened waveform;

(c) an all-pole filter (APF) provided to color said scaled and whitened waveform into a synthesized waveform;

(d) wherein said all-pole filter performs the following z-transform:

$$B(z/\beta) = \frac{1}{1 - \sum_{i=1}^{q} b_i \beta^i z^{-i}}$$

where $b_i$'s are linear predictive coefficients obtained from either said original waveform or a target waveform to be shifted to, q is an integer greater than 0, and $\beta$ is a weighting factor such that $0<\beta\leqq 1$.

9. The music tone generating apparatus according to claim 8 wherein $\beta=1$ and said all-pole filter performs the following z-transform:

$$B(z) = \frac{1}{1 - \sum_{i=1}^{q} b_i z^{-i}}$$

10. The music tone generating apparatus according to claim 8 wherein:

(a) said whitened waveform has been compressed into a wavetable before it is stored in said memory; and (b) said pitch-shifter further comprises a decoder for decompressing said wavetable.

11. The music tone generating apparatus according to claim 8 wherein said original waveform is whitened using an all-zero filter (AZF) which performs the following z-transform:

$$A(z/\alpha) = 1 - \sum_{i=1}^{p} a_i \alpha^i z^{-1}$$

where $a_i$'s are linear predictive coefficients obtained from said original waveform, p is an integer greater than 0, and $\alpha$ is a weighting factor such that $0<\alpha\leqq 1$.

12. The music tone generating apparatus according to claim 8 wherein $\alpha=1$ and said all-pole filter performs the following z-transform:

$$A(z) = 1 - \sum_{i=1}^{p} a_i z^{-i}$$

13. The music tone generating apparatus according to claim 8 wherein said $b_i$'s are linear predictive coefficients obtained from said original waveform such that $b_i=a_i$.

14. The music tone generating apparatus according to claim 8 wherein at least one of said p and q equals 4.

* * * * *